United States Patent [19]

Farris et al.

[11] Patent Number: 4,503,929

[45] Date of Patent: Mar. 12, 1985

[54] SLEEVE VALVE FOR AN AIR GUN HAVING A RECIPROCATING SHUTTLE VALVE

[75] Inventors: Richard C. Farris, Dickinson; Mario J. Diaz, Houston, both of Tex.

[73] Assignee: Litton Resources Systems, Inc., Alvin, Tex.

[21] Appl. No.: 359,343

[22] Filed: Mar. 18, 1982

[51] Int. Cl.³ ............................ G01V 1/06; G01V 1/38
[52] U.S. Cl. ..................................... 181/118; 367/144; 181/120
[58] Field of Search ............... 181/106, 110, 118, 120; 367/144; 173/116, 134, 112, 125; 124/66-69, 75

[56] References Cited

U.S. PATENT DOCUMENTS 4,180,139  12/1979  Walker ............................... 181/115

Primary Examiner—Nelson Moskowitz
Assistant Examiner—Gregory C. Issing
Attorney, Agent, or Firm—William A. Knox

[57] ABSTRACT

An air gun of the reciprocating shuttle type includes a split-ring sleeve valve that is expandable against the inner wall of a firing chamber. The sleeve valve encircles the shuttle body. The shuttle body and the sleeve valve include a set of air release orifices that are alignable with a corresponding set of air exhaust ports of the firing chamber.

4 Claims, 3 Drawing Figures

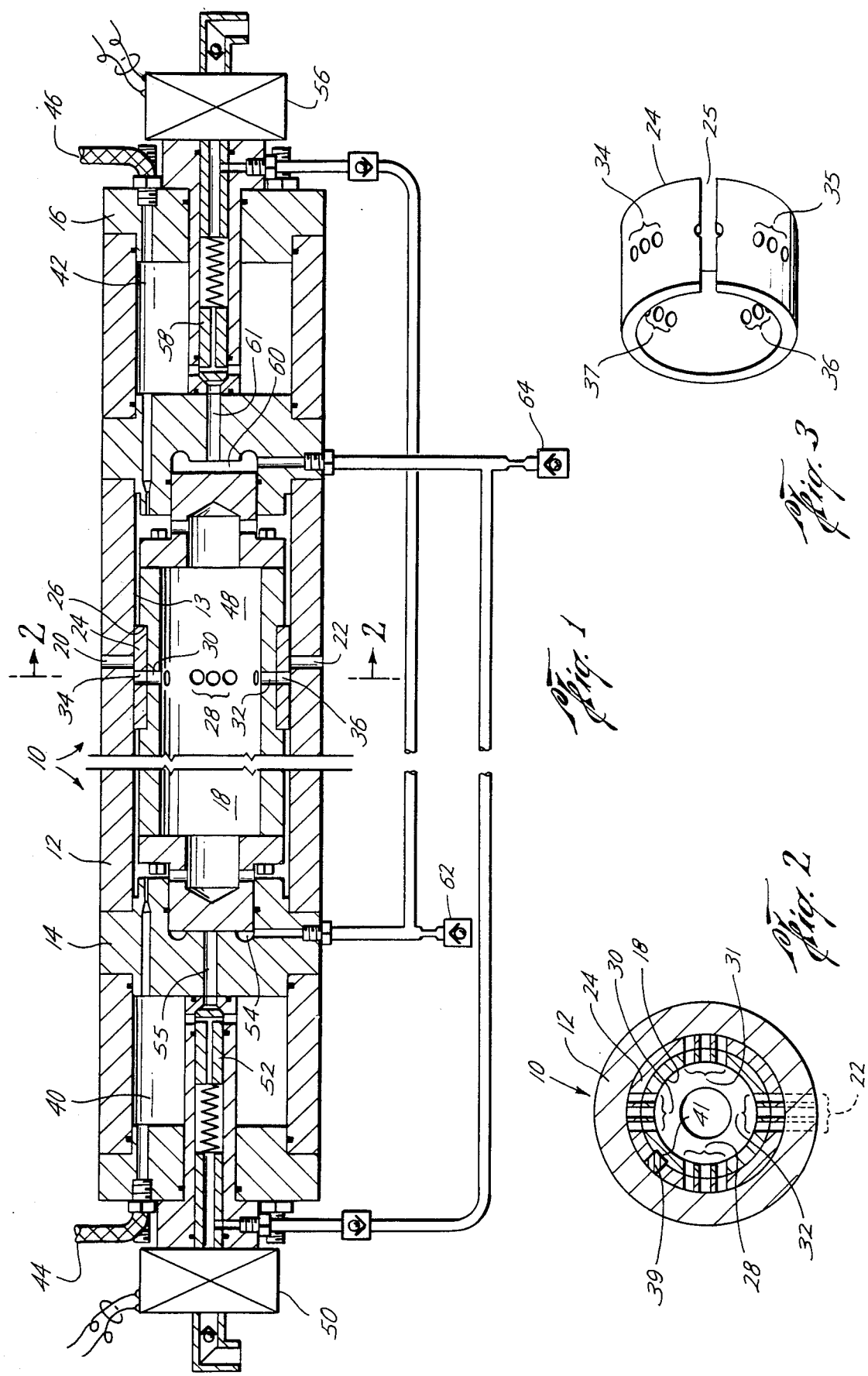

SLEEVE VALVE FOR AN AIR GUN HAVING A RECIPROCATING SHUTTLE VALVE

BACKGROUND OF THE INVENTION

1. Field of the Invention

This invention is concerned with an air gun having a reciprocating shuttle valve for use in marine seismic exploration such as will be found in class 181/120.

2. Description of the Prior Art

The subject matter of this invention provides an improvement over the air guns disclosed in U.S. Pat. No. 4,180,139, 4,211,300 and applications Ser. No. 180,788 now U.S. Pat. No. 4,324,311, and Ser. No. 289,564, patent pending all of which are commonly owned by a sister firm of the assignee of this invention. Application Ser. No. 180,788, now U.S. Pat. No. 4,324,311 is incorporated herein by reference with respect to features that are common to that patent and to this disclosure.

The referenced patent discloses an air gun that consists of an elongated cylindrical housing, closed at both ends by end plates, for containing a volume of compressed air and which forms a firing chamber. Radially-positioned air exhaust ports are bored through the wall of the housing. A hollow cylindrical shuttle valve is mounted concentrically inside the housing. The shuttle valve is adapted to slide linearly back and forth, inside the housing, in alternate strokes. One or more radially-positioned sealing pads, having orifices that are alignable with the exhaust ports, are spring-mounted in apertures in the wall of the shuttle. When the shuttle is positioned at either end of the housing, the pads block the exhaust ports. When the shuttle is driven from one end of the housing to the other end, the orifices in the pads pass by the exhaust ports and momentarily unblocks the exhaust ports to allow impulsive release of some of the compressed air from the firing chamber.

In the practical design of the air gun of the referenced patent, several sealing pads were floatingly mounted in a corresponding number of relatively large apertures in the shuttle valve body. Small springs between the sealing pads and the shuttle body, held the sealing pads firmly against the inner wall of outer housing when the air gun was unpressurized. When the gun was disassembled for maintenance, the floating pads and springs had a disconcerting tendency to fall out of the apertures. Further, upon reassembly, the several pads were difficult to hold in place, all at the same time, while sliding the shuttle back into the housing. Other problems, including air leakage between the sealing pads and the inner housing wall made it necessary to provide an improved sealing member or valve.

An additional problem arose in connection with the relatively large apertures that were cut into the shuttle body to receive the sealing pads. Because the shuttle is forcibly driven against the stops at opposite ends of the gun, it was subjected to repeated severe shock loadings. The presence of the large apertures structurally weakened the shuttle body and fatigue fractures occurred at the corners of the apertures. But making the shuttle more massive to compensate for the inherent structural weakness, added more weight. Additional shuttle weight of course, demanded more power to overcome shuttle inertia.

SUMMARY OF THE INVENTION

It is the object of this invention to replace the individual sealing pads of the earlier-referenced air gun, with an improved sleeve-type valve member.

In accordance with an aspect of this invention, the shuttle body of a reciprocating-shuttle air gun is provided with several sets of radially positioned air release ports. The air release ports are momentarily alignable with corresponding sets of air exhaust ports bored in the wall of an outer housing, when the shuttle is reciprocated back and forth within the housing. A split-ring, spring-metal sleeve valve encircles the outer wall of the shuttle body. The sleeve defines sets of radially positioned orifices that match the sets of air release ports in the shuttle-member body. A guide prevents axial rotation of the sleeve relative to the air release ports.

BRIEF DESCRIPTION OF THE DRAWINGS

The benefits and advantages of this invention may best be appreciated by reference to the appended Detailed Description and the Drawings, wherein:

FIG. 1 is an overall view in longitudinal cross section of a reciprocating shuttle-valve air gun;

FIG. 2 is a cross section of the air gun along lines 2—2; and

FIG. 3 is a perspective view of the sleeve valve.

DETAILED DESCRIPTION OF THE INVENTION

Referring to FIG. 1, there is shown the above-referenced air gun in longitudinal cross section, but incorporating the teaching of this invention. Inasmuch as the air gun and its operation was described in great detail in U.S. Pat. No. 4,324,311, only a summary of the features of the gun will be discussed in this disclosure.

Air gun 10 consists of a housing 12, preferably cylindrical, closed by end plates 14, 16 forming a firing chamber. A hollow shuttle body 18 is mounted concentrically with housing 12 and may slide linearly back and forth within housing 12. Sets of air exhaust ports such as 20, 22 are drilled through the wall of housing 12. A sleeve valve 24 encircles the outer wall of shuttle body 18, resting in and retained by a slot or groove 26. Air release ports 28, 30, 32 are bored in the wall of shuttle body 18. Corresponding orifices 34, 36 are drilled in sleeve valve 24. When the shuttle is at rest at either end of the housing, the sleeve valve blocks the exhaust ports as shown. When the shuttle executes a stroke as from the left hand end of the gun to the right hand end, the sleeve valve orifices momentarily unblock the exhaust ports as they pass by the exhaust ports to allow emission of a jet of compressed air from hollow shuttle 18.

Shuttle 18 is pneumatically operated. High pressure air is supplied to accumulator chambers 40, 42 through air hoses 44 and 46 from a compressor, not shown. From the accumulator chambers, high pressure air enters firing chamber 48. To fire the gun 10, a solenoid vent valve such as 50 is actuated which removes the back pressure from poppet valve plunger 52, allowing the plunger to open. High pressure air, flowing from accumulator chamber 40 into actuator chamber 54 through passageway 55, pneumatically drives the shuttle to the right. As the openings in shuttle body 18 and sleeve valve 24 pass the exhaust ports, some of the air in firing chamber 48 is released through the exhaust ports. At the end of the stroke in one direction, such as to the right, and after a preselected time interval, solenoid vent valve 56 opens, allowing plunger 58 to open. High pressure air from accumulator chamber 42 enters actuator chamber 60, through passageway 61 to drive shuttle 18 back to the left as shown in FIG. 1. Thus, by admitting compressed air alternately at predetermined intervals to actuator chambers 54 and 60, shuttle 18 is reciprocated back and forth in alternate strokes, discharging a portion of the air from firing chamber 48 each time the sleeve valve orifices pass the exhaust ports. Between firings, the air pressure in actuation chambers 54 and 60 is reduced to ambient pressure through check valves 62 and 64 and the air in firing chamber 48 is recharged to full pressure.

Referring now to FIG. 2, there is shown a transverse cross section of air gun 10, taken along lines 2—2'. Housing 12 in FIG. 2 is shown with one set of exhaust ports 22, indicated by dashed lines. However, it should be understood that there are four sets of exhaust ports; the other three are not shown to avoid confusing the illustration.

Sleeve valve 24 is in the form of a split ring about 0.15–0.20 inch thick and 2.0 inches wide. See FIG. 3 which is a perspective view. It is split at point 25 to provide a gap when relaxed of about a half inch, assuming an outer diameter of 6.0 inches. The sleeve valve is preferably made of a beryllium-copper or aluminum bronze alloy spring metal. The sleeve valve 24 defines four sets of orifices 34, 35, 36, 37 (FIG. 3) that match with corresponding sets of air release ports 28, 30, 31, and 32 as shown in FIG. 2.

In use, the sleeve valve 24 is radially spread apart at the gap 25 so that it will slip over the outer diameter of valve member 18. When in place, sleeve valve 24 is snapped into slot or groove 26 that is formed around the outer shuttle. When sleeve valve 24 is in place around shuttle member 18, the assembly is inserted into outer housing 12. Upon insertion, the sleeve is a little bit compressed, but there is a slight clearance between the inner surface of the sleeve and the bottom surface of retaining slot 26. The clearance will be on the order of 1/32" to 1/16". Therefore, relative to the valve body 18, sleeve 24 is floating. When in place and under compression, the spring constant of sleeve 24 is such that it exerts pressure against the inner wall 13 of housing 12 that is, the firing chamber. The pressure is sufficient to seal the exhaust ports against an ambient water pressure at a desired operating depth such as 20–30 feet of water when the firing chamber 48 of gun 10 is unpressurized. That capability is essential to keep the gun from flooding when it is inoperative.

In the exemplary embodiment, sleeve valve 24 is retained in place in a slot or groove 26 around valve body 18. Other means, such as short pins or studs could equally be used.

In general, it has been found that spring-metal sleeves provide a better seal than did the prior-art sealing pads because the metallic sleeves are more compliant in seating themselves against slight irregularities on the inner wall 13 of housing 12 and they appear to lap themselves into place after a few operating cycles.

It is essential of course that the shuttle body 18 and the sleeve valve 24 be constrained from axial rotation with respect to firing chamber so that the air release ports, valve orifices and air exhaust ports all will be mutually alignable. To that end, a longitudinal key 39 is secured to the inner wall 13 of housing 12 as shown in FIG. 2 (but hidden from view in FIG. 1). A longitudinal keyway 41 is milled along the outer wall of the shuttle member. The keyway 41 mates with key 39. The gap 25 in sleeve valve 24 is designed to also snugly mate with key 39 after compression inside housing 12 so that all of the ports remain in radial alignment.

This invention has been disclosed showing a single sleeve valve and four sets of exhaust ports. It will be apparent to those skilled in the art that several such sleeve valves and exhaust ports may be positioned along the length of shuttle member 18 and housing 12. The exhaust ports may also be slots instead of a set of holes. More or fewer sets of orifices and exhaust ports could be employed with each sleeve valve, depending upon the physical size of the gun.

We claim as our invention:

1. An air gun of the reciprocating shuttle type for underwater signalling, the gun having a housing defining a firing chamber for receiving a volume of compressed air, a reciprocable shuttle valve slidingly mounted in said firing chamber, means at each of opposite ends of said firing chamber for reciprocating said shuttle valve back and forth in alternate linear strokes, the firing chamber defining at least one set of radially-positioned air exhaust ports, said shuttle valve comprising:
    a shuttle body defining at least one set of radially-positioned air release ports;
    at least one split sleeve valve, defining a set of orifices alignable with the air release ports, encircling at least a portion of the shuttle body; and
    means for floatingly retaining said split sleeve valve at a desired position relative to the shuttle body.

2. The improved air gun as defined in claim 1, further comprising:
    means for maintaining mutual radial alignment of the air release ports in said valve body and the orifices in said sleeve valve with respect to said air exhaust ports defined by said firing chamber.

3. The improved air gun as defined by claim 1 wherein the split sleeve valve is made of a spring metal and designed to apply an outward pressure against the inner wall of the firing chamber.

4. The improved air gun as defined by claim 3 wherein the spring constant of said sleeve valve is sufficient to hold said exhaust ports closed against the ambient water pressure at a desired operating depth when said shuttle valve is at rest in either one of two sealing positions while said gun is inoperative.

* * * * *